(12) United States Patent
Fulghum et al.

(10) Patent No.: US 8,098,715 B2
(45) Date of Patent: Jan. 17, 2012

(54) METHOD AND APPARATUS FOR ESTIMATING IMPAIRMENT COVARIANCE MATRICES USING UNOCCUPIED SPREADING CODES

(75) Inventors: Tracy Fulghum, Durham, NC (US); Gregory E. Bottomley, Cary, NC (US); Yi-Pin Eric Wang, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 839 days.

(21) Appl. No.: 12/135,268

(22) Filed: Jun. 9, 2008

(65) Prior Publication Data
US 2008/0304554 A1    Dec. 11, 2008

Related U.S. Application Data

(60) Provisional application No. 60/942,921, filed on Jun. 8, 2007.

(51) Int. Cl.
*H04B 1/00* (2006.01)
(52) U.S. Cl. ..................................................... 375/149
(58) Field of Classification Search .............. 375/144, 375/147, 148, 149, 150, 151, 265, 267, 329; 370/203, 208, 320, 335, 342, 441
See application file for complete search history.

(56) References Cited

U.S. PATENT DOCUMENTS

| | | | |
|---|---|---|---|
| 6,363,104 B1 | 3/2002 | Bottomley | |
| 7,254,170 B2 * | 8/2007 | Shiu et al. | 375/227 |
| 2003/0072282 A1 * | 4/2003 | Liang | 370/335 |
| 2003/0133424 A1 * | 7/2003 | Liang et al. | 370/335 |
| 2005/0163196 A1 * | 7/2005 | Currivan et al. | 375/144 |
| 2005/0195889 A1 * | 9/2005 | Grant et al. | 375/148 |
| 2005/0201447 A1 | 9/2005 | Carins | |
| 2006/0007990 A1 | 1/2006 | Cozzo et al. | |
| 2006/0221992 A1 * | 10/2006 | Chan et al. | 370/445 |

(Continued)

FOREIGN PATENT DOCUMENTS
WO    2005/096517 A1    10/2005

OTHER PUBLICATIONS

International Preliminary Report on Patentability mailed Dec. 30, 2009 in corresponding PCT Application No. PCT/US2008/066853.

(Continued)

*Primary Examiner* — David C. Payne
*Assistant Examiner* — Syed Haider
(74) *Attorney, Agent, or Firm* — Nixon & Vanderhye, P.C.

(57) ABSTRACT

In one of its aspects, the technology concerns a method of processing a signal which includes physical data channels which have been channelized using spreading codes. The method comprises (1) despreading unoccupied spreading codes (e.g., codes which are essentially unobscured by traffic data) included in the signal to obtain unoccupied code despread values, (2) using the unoccupied code despread values to form an impairment covariance matrix; and (3) using the impairment covariance matrix along with a channel estimate to form a processing parameter. The processing parameter can be one of combining sets and a signal quality estimate. In another of its aspects, the technology concerns a coherent, linear equalizer apparatus configured to process a signal which includes physical data channels which have been channelized using spreading codes. The equalizer apparatus comprises plural delay fingers (32) configured to despread unoccupied spreading codes included in the signal to obtain unoccupied code despread values, and a generator (60) configured to use the unoccupied code despread values to form an impairment covariance matrix.

29 Claims, 11 Drawing Sheets

U.S. PATENT DOCUMENTS

2006/0251156 A1* 11/2006 Grant et al. .............. 375/148
2006/0268962 A1   11/2006 Cairns et al.
2007/0104254 A1    5/2007 Bottomley et al.
2008/0130719 A1    6/2008 Bottomley
2008/0291980 A1* 11/2008 Currivan et al. .......... 375/148

OTHER PUBLICATIONS

International Search Report and Written Opinion mailed Jan. 28, 2009 in corresponding PCT Application No. PCT/US2008/066853.

G. Bottomley, T. Ottosson, Y.-P.B. Wang, "A Generalized RAKE Receiver for Interference Suppression"; IEEE Journal on Selected Areas of Communications, vol. 18, No. 8, pp. 1536-1545, Aug. 2000.

Kernin Li and Hui Liu, "A New Blind Receiver for Downlink DS-CDMA Communications", IEEE Comm. Letters, Jul. 1999.

D.T. Slock and I. Ghauri, "Blind Maximum SINR Receiver for the DS-CDMA Downlink", Proceedings of the IEEE ICASSP 2000.

M. Lenardi and D.T. Slock, "A G-RAKE Receiver with Intracell Interference Cancellation for a DS-CDMA Synchronous Downlink with Orthogonal Codes", Proceedings of VTC 2000.

M. Lenardi, A. Medles, and D.T. Slock, "Intercell Interference Cancellation at a WCDMA Mobile Terminal by Explointing Excess Codes", Proceedings of VTC 2001 Spring.

Reed et al, "Rapid convergence rate in adaptive arrays," *IEEE Trans. Aerospace and Electronic Systems*, vol. AES-IO, pp. 853-863, Nov. 1974.

* cited by examiner

METHOD AND APPARATUS FOR ESTIMATING IMPAIRMENT COVARIANCE MATRICES USING UNOCCUPIED SPREADING CODES

This application claims the priority and benefit of U.S. Provisional Patent Application 60/942,921, filed Jun. 8, 2007, and entitled METHOD AND APPARATUS FOR ESTIMATING IMPAIRMENT COVARIANCE MATRICES USING UNOCCUPIED SPREADING CODES, which is incorporated herein by reference in its entirety. This application is related to U.S. provisional patent application 60/943,975, filed on Jun. 14, 2007, entitled "EFFICIENT METHOD FOR FORMING AND SHARING G-RAKE IMPAIRMENT COVARIANCE MATRIX", which is incorporated herein by reference in its entirety.

TECHNICAL FIELD

This invention pertains to telecommunications, and particularly to processing of a signal which employs spreading codes.

BACKGROUND

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with the radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a unique identity within the local radio area, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation or "3G" mobile communication system, which evolved from the Global System for Mobile Communications (GSM), and is intended to provide improved mobile communication services based on Wideband Code Division Multiple Access (WCDMA) technology. UTRAN is essentially a radio access network providing wideband code division multiple access for user equipment units (UEs). The Third Generation Partnership Project (3GPP) has undertaken to evolve further the predecessor technologies, e.g., GSM-based and/or second generation ("2G") radio access network technologies.

With the adoption of release 6 of the WCDMA standard, a new type of uplink user was introduced. This new user was called an "enhanced" uplink (EUL) user. EUL users are characterized by short (10 or 2 ms) transmit time intervals (TTI), single or multi-code transmission, and potentially large transmit powers. These characteristics enable significantly higher peak data rates than what was achievable previously. Unfortunately, such high-power transmissions significantly increase interference for other uplink users.

One way to address the interference is through the use of a generalized-RAKE (G-RAKE) receiver. RAKE receivers have typically and historically been employed in WCDMA receivers to combat signal fading due to multi-path propagation. Multi-path propagation results from the fact that, in a wireless communication system such as WCDMA, a transmitted signal may travel through multiple propagation paths so that the received signal is a composite of multiple time-shifted versions of the signal. The different time-shifted versions of the signal (e.g., signal images) suffer from different phase and attenuation effects. The multiple time-shifted signal images combine at the receiver in an unpredictable manner, resulting in signal fading.

The goal of the RAKE receiver generally is to detect the individual signal images and combine them coherently. A RAKE receiver typically includes a plurality of correlators, sometimes referred to as fingers, to separately despread different time-shifted signal images, and a combiner to combine the correlator outputs. A delay searcher processes the received signal to identify the delays corresponding to the strongest signal images, and a finger placement processor determines the finger placement based on those delays. The process of finger placement comprises the assignment of a delay to each RAKE finger to align the RAKE finger in time with a signal image.

The G-Rake receiver is an extension of the Rake receiver that is capable of suppressing interference through exploiting the temporal and spatial correlations of an interfering signal. An example generalized RAKE (G-RAKE) receiver is described, e.g., in U.S. Pat. No. 6,363,104, which is incorporated herein by reference. The G-RAKE receiver was proposed to suppress interference in CDMA systems. See, e.g., G. Bottomley, T. Ottosson, Y.-P. B. Wang, "A Generalized RAKE Receiver for Interference Suppression"; IEEE Journal on Selected Areas of Communications, vol. 18, no. 8, pp. 1536-1545, August 2000. Interference suppression is achieved through a set of combining weights that account for correlation between the receiver fingers. The combining weights are given by Expression (1a)

$$w = R_u^{-1} h \qquad \text{Expression (1a)}$$

where w is a vector of combining weights, $R_u$ is an impairment covariance matrix (including both interference and noise), and h is a vector of net channel coefficients (the term "net" refers to the combined contribution of the transmit filter, radio channel g, and receive filter). Impairment covariance matrices are described, e.g., in U.S. patent application Ser. No. 11/219,183, entitled "ADAPTIVE TIMING RECOVERY VIA GENERALIZED RAKE RECEPTION", and United States Patent Publication 2005/0201447/A1, both of which are incorporated herein by reference in their entirety. Parametric computation of an impairment covariance matrix is described, e.g., Cairns et al., Method and apparatus for parameter estimation in a Generalized RAKE receiver, PCT/EP2005/002419, which is incorporated herein by reference in its entirety. The impairment covariance matrix is also used to estimate signal quality, such as SINR, using for example $$SINR = h^H R_u^{-1} h \qquad \text{Expression (1b)}$$

Determining the impairment covariance matrix is typically a prerequisite to generating a proper set of combining weights.

It is also a computationally demanding step that must be performed for each uplink user. Thus, the complexity of the G-RAKE solution may exceed the available baseband computation resources as the cell load increases.

Accurate estimation of the impairment covariance matrix used in a G-RAKE or symbol-level weight solution is necessary for maximum performance of the receiver, whether the estimated impairment covariance matrix is used directly (the "non-parametric" G-RAKE solution) or indirectly (for determining scaling parameters of the "parametric G-RAKE solution). The same problem occurs in other equalizer architectures, such as a chip-level or chip equalizer (weights are used in a filter prior to despreading).

As mentioned above, with the introduction of enhanced uplink in 3GPP release 6, a high data rate user within a cell or from other cell may cause significant interference to other uplink users. The parametric G-RAKE solution requires knowledge of channel coefficients for each of the interfering signals to form a model term. Models terms associated with different interferers are weighted and combined with a noise term to formulate estimated impairment covariance. In this way, parametric G-RAKE suppresses an interfering signal that is modeled if it dominates the overall impairment.

In practical implementation, channel coefficients associated with an other-cell interferer might not be available. For example, in the uplink, this may be due to the limitation on the communications between different NodeB's. Even for own-cell interferers, it could be difficult to make their channel coefficients available to the baseband processor of another desired signal if different baseband processor boards are involved. Thus, dominant interference either from other-cell users or other own-cell users makes non-parametric G-RAKE approach favorable.

Generally, the impairment covariance matrix has been estimated using estimated impairment on the limited number of despread pilot symbols in a slot. The limited number of pilot symbols with which to estimate yields substantial estimation error on the resulting covariance matrix. Improvement of this estimation has been accomplished by smoothing multiple estimates together over multiple slots. However, this extension of the estimation window tends to reduce a receiver's ability to track a changing channel as well as follow the burstiness of packet interference power.

Covariance matrix estimation can also be improved through the use of chip samples to estimate data covariance matrix, however this can be undesirably complex and require the conversion from data to impairment covariance.

The prior art does contain examples of using unused codes in blind demodulation. In Kemin Li and Hui Liu, "A new blind receiver for downlink DS-CDMA communications," *IEEE Comm. Letters*, July, 1999, unused codes are used to estimate quantities needed to compute blind linear chip equalization weights. One of these quantities $R\_0$, is basically an impairment covariance formed from unused code despread values. However, this covariance is not used with channel estimates to form coherent combining weights. Instead, it is used with a signal covariance to solve for a generalized eigenvector.

The approach in Kemin Li and Hui Liu, "A new blind receiver for downlink DS-CDMA communications," *IEEE Comm. Letters*, July, 1999, is extended in D. T. Slock and I. Ghauri, "Blind maximum SINR receiver for the DS-CDMA downlink," *Proceedings of IEEE ICASSP* 2000, by adding a constraint to avoid signal cancellation. A variation of this approach is considered in M. Lenardi and D. T. Slock, "A G-RAKE receiver with intracell interference cancellation for a DS-CDMA synchronous downlink with orthogonal codes," *Proceedings of VTC* 2000. In M.

Lenardi, A. Medles, and D. T. Slock, "Intercell interference cancellation at a WCDMA Mobile terminal by exploiting excess codes," *Proceedings of VTC* 2001 *Spring*, several structures which use unused codes are considered, in which the received signal is projected onto the unused codes.

What is needed, therefore, and an object of the present invention, are apparatus, method(s), and technique(s) for obtaining accurate estimation of a impairment covariance matrix.

SUMMARY

In one of its aspects, the technology concerns a method of processing a signal which includes physical data channels which have been channelized using spreading codes. The method comprises (1) despreading unoccupied spreading codes (e.g., codes which are essentially not used to spread traffic or control data) included in the signal to obtain unoccupied code despread values, (2) using the unoccupied code despread values to form an impairment covariance matrix; and (3) using the impairment covariance matrix in conjunction with a channel estimate to form a processing parameter. The processing parameter can be, for example, a weighing parameter (e.g., combining weights) or a signal quality estimate.

Determining which of the spreading codes are, in fact, unoccupied spreading codes can be determined or accomplished in several different ways. In a first example mode, which codes are unoccupied spreading codes is known by virtue of the fact that the unoccupied spreading codes are those which, according to available resource allocation information, are not allocated for use, e.g., those not allocated for user traffic, control information, or other use. In a second example mode, which codes are unoccupied spreading codes is detected by, e.g., a parameter indicative of non-allocation of the code, such as received code power, for example.

Not all unoccupied spreading codes need necessarily be used for forming the impairment covariance matrix. In an example embodiment, a selected number of unoccupied spreading codes from which to obtain the unoccupied code despread values is determined as a function of a number of finger delays used for performing the despreading. Each of the finger delays may be associated with a receiver antenna.

Obtaining the unoccupied code despread values can be accomplished in several ways. A first example implementation comprises using the plural delay fingers to obtain (from the received signal) corresponding plural despread values at corresponding plural delays, and then processing the plural despread values obtained from each of the plural delay fingers into unoccupied code despread values and occupied code despread values. One example way of achieving this comprises using a transform for processing the plural despread values obtained from each of the plural delay fingers into unoccupied code despread values and occupied code despread values. The transform can be one of a fast Hadamard transform, also known as fast Walsh transform.

A second example implementation for obtaining the unoccupied code despread values comprises assigning dedicated delay fingers to the unoccupied spreading codes from which the unoccupied code despread values are obtained, and using output values from the dedicated delay fingers as the unoccupied code despread values.

In an example embodiment, the act of using the unoccupied code despread values to form an impairment covariance matrix further comprises forming vectors using the unoccupied code despread values as obtained from plural delay fingers; and then operating upon the vectors to form the impairment covariance matrix. An example of such operation operating upon the vectors is taking outer products of the vectors.

In an example embodiment, the act of forming the impairment covariance matrix comprises using the expression $$R_u(a, b) = \left(\frac{1}{K}\right)\sum_{k=0}^{K-1} x_k(a)x_k^*(b)$$

wherein $R_u$ is the impairment covariance matrix, $x_k$ are the despread value vectors at k sample instant, K is a number of samples, and superscript "*" represents taking the conjugate.

The impairment covariance matrix can be generated over any of several time bases. For example, one mode of operation comprises obtaining/generating one impairment covariance matrix per time slot. Another mode of operation comprises obtaining/generating an impairment covariance matrix for each of plural sub-time slot periods, and then extrapolating or interpolating plural impairment covariance matrices obtained for each of the plural sub-time slot periods. Another mode of operation comprises obtaining/generating one impairment covariance matrix per symbol period, and then processing plural impairment covariance matrices obtained for each of plural symbol periods to obtain a resultant impairment covariance matrix for a time slot.

The impairment covariance matrix can be used in any of a variety of manners to obtain or form, e.g., a processing parameter(s). For example, when utilized in a G-RAKE receiver or the like, the impairment covariance matrix can be used, in conjunction with an estimated channel response, to obtain a processing parameter(s) in the form of weighting values that account for correlation between the processing delays. Alternatively, the impairment covariance matrix can be used to form a signal quality (signal to interference plus noise ratio) estimation for a chip equalizer or a symbol equalizer.

In another of its aspects, the technology concerns a coherent, linear equalizer apparatus configured to process a signal, and particularly a signal which includes physical data channels which have been channelized using spreading codes. The equalizer apparatus comprises plural delay fingers configured to despread unoccupied spreading codes included in the signal to obtain unoccupied code despread values, and a generator configured to use the unoccupied code despread values to form an impairment covariance matrix. The equalizer can be utilized as a chip equalizer or a symbol equalizer, such as a G-RAKE receiver. For example, when utilized in a G-RAKE receiver, the equalizer can be situated at a radio base station of a radio access network node and configured to use the impairment covariance matrix and an estimated channel response to form weighting values that account for correlation between the delay fingers. Alternatively, if it is utilized in a chip equalizer, the impairment covariance matrix can be used together with an estimated channel response to form filter weights or coefficients for processing receive samples.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
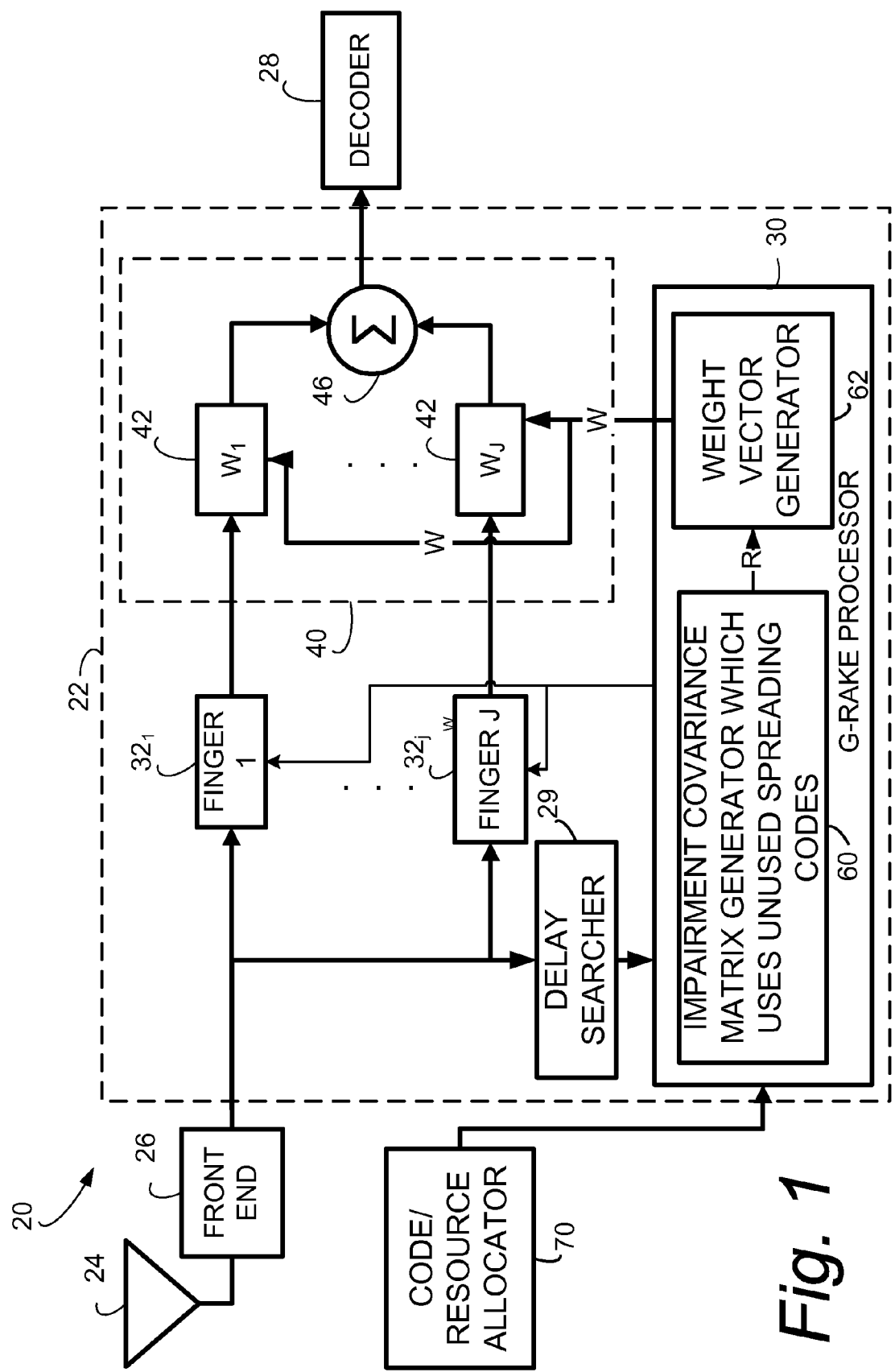
FIG. 1 is a diagrammatic view of an example embodiment of a linear equalizer which employs unused spreading codes to generate an impairment covariance matrix.

FIG. 1 illustrates a representative wireless receiver 20 including G-RAKE receiver 22 according to one example embodiment. The wireless receiver 20 comprises one or more receive antenna(s) 24; receiver front-end 26, G-RAKE receiver 22, and decoder 28. G-RAKE receiver 22 comprises delay searcher 29, G-RAKE processor 30, a plurality of G-RAKE fingers 32 (e.g., G-RAKE fingers $32_1$ through $32_j$), and weighting network 40.

Receiver front-end 26 filters, down-converts, and samples the receive signal from antenna (antennas) 24 to generate a baseband signal for processing. The sampling interval may, for example, be one-half the chip period $T_c$. The signal samples from receiver front-end 26 are input to one or more G-RAKE fingers 32, whose function is to correlate with the spreading code.

Delay searcher 29 identifies the individual signal images in a received signal and determines the delay associated with each signal image. The G-RAKE fingers 32 detect respective signal images in a multi-path signal. Each of the G-RAKE fingers 32 is associated with a particular receive antenna and a specific processing delay (the specific processing delay for each G-RAKE finger 32 is determined/assigned by G-RAKE processor 30 based on information supplied by delay searcher 29).

The weighting network 40 combines the outputs of the G-RAKE fingers 32 to generate a combined G-RAKE output signal. Decoder 28 decodes the combined G-RAKE output signal.

Figure 2:
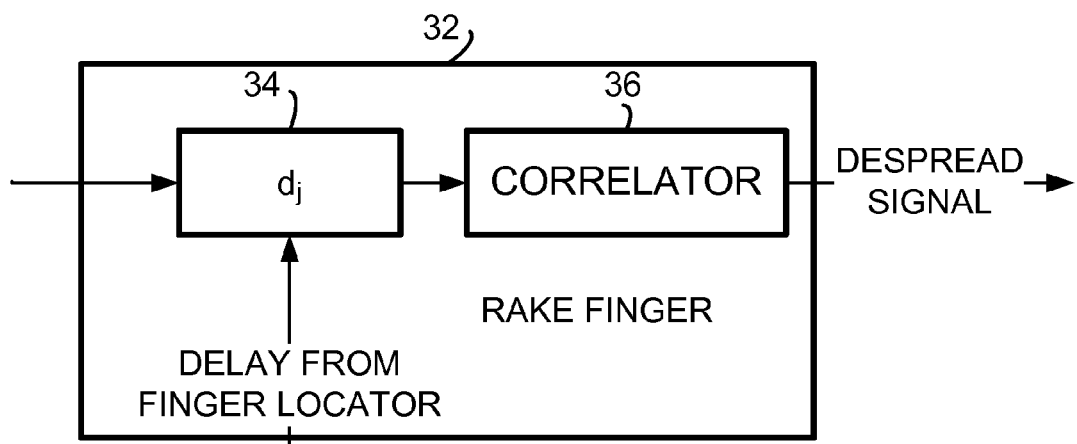
FIG. 2 is a diagrammatic view of a G-RAKE finger according to an example embodiment.

As seen in FIG. 2, each G-RAKE finger 32 comprises delay element 34 and correlator 36. The delay element 34 aligns finger 32 with a selected signal image by delaying the received signal by a configurable delay determined by G-RAKE processor 30. The correlator 36 correlates the delayed signal with a known spreading sequence associated with a desired signal to despread the received signal. As a result of the correlation process, unwanted signals contained in the received signal appear as noise to the receiver.

Weighting network 40 (see FIG. 1) weights and combines the despread signals output from the individual G-RAKE fingers 32. Weighting elements 42 apply a weighted coefficient to respective G-RAKE finger outputs and G-RAKE combiner 46 combines the weighted G-RAKE output signals to generate a combined decision statistic, referred to herein as the G-RAKE output signal. The G-RAKE output signal is applied to decoder 28, which decodes the G-RAKE output signal to generate an estimate of the originally transmitted signal.

Figure 3:
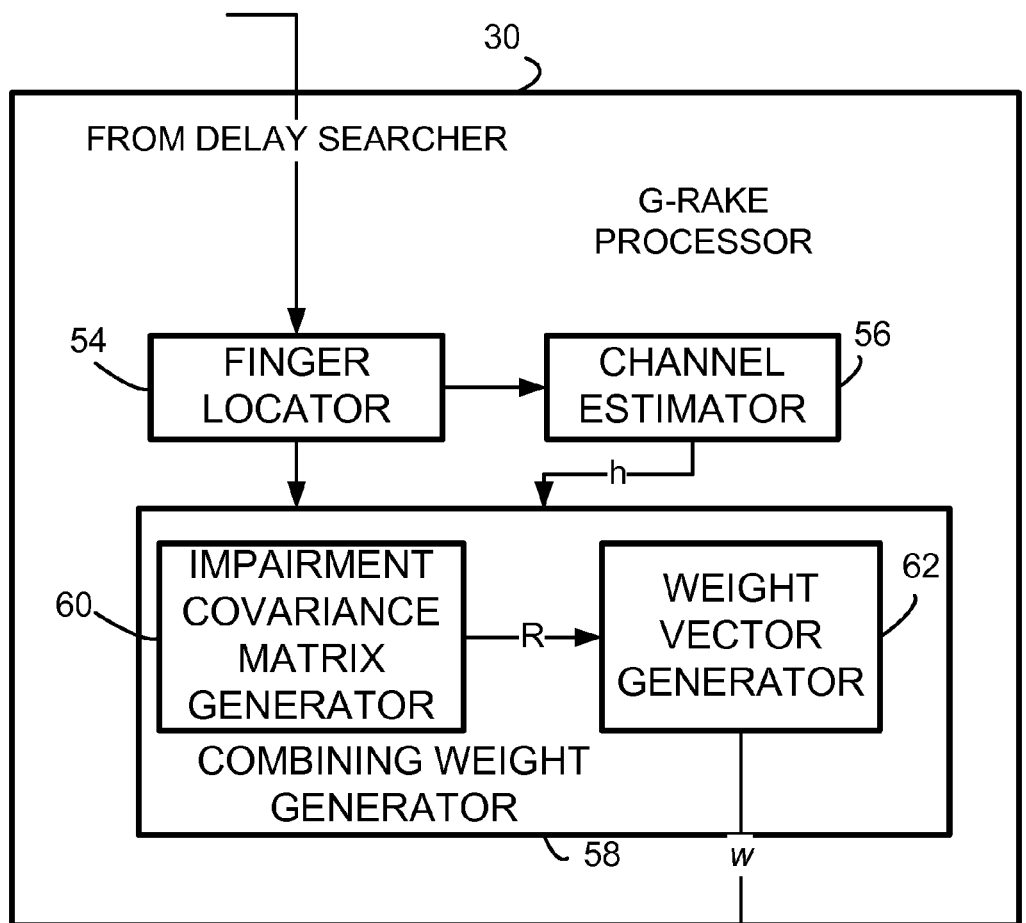
FIG. 3 is a diagrammatic view of a G-RAKE processor according to an example embodiment.

FIG. 3 illustrates an example embodiment of G-RAKE processor 30. The path delays of the detected signal images as determined by delay searcher 29 are input to G-RAKE processor 30. The G-RAKE processor 30 determines the number and placement of G-RAKE fingers 32 based on the path delay estimates provided by delay searcher 29. Additionally, G-RAKE processor 30 calculates weighting coefficients to be applied to the individual G-RAKE finger outputs. The G-RAKE processor 30 includes finger locator 54; channel estimator 56; and combining weight generator 58. Finger locator 54 determines the locations of the G-RAKE fingers 32 based on the estimated path delays reported by delay searcher 29. Channel estimator 56 generates estimates of the propagation channel from the transmitter to the receiver for each assigned G-RAKE finger 32. The channel estimates are provided to the combining weight generator 58.

Combining weight generator 58 computes the combining weights applied to the G-RAKE finger outputs. Combining weight generator 58 comprises impairment covariance matrix generator 60. The covariance matrix generator 60 computes impairment correlations across the G-RAKE fingers 32 and generates an impairment covariance matrix R. The combining weight generator 58 further comprises weight vector generator 62 which multiplies the vector of the channel estimates h from the channel estimator 56 by the inverse of the impairment covariance matrix R to generate a weight vector w whose elements are the weighting factors for the outputs of G-RAKE fingers 32. Alternatively, the combining weight vector can be obtained through using linear equation solution methods such as the Gauss-Seidel algorithm.

The particular wireless receiver 20 shown in FIG. 1 happens to be a node of a radio access network (RAN) such as a radio base station, also known as a "B Node" or "NodeB". As such, the wireless receiver 20 of the node operates on a downlink (DL) to send transmissions to plural wireless mobile terminals (e.g., user equipment units (UEs) or mobile stations (MSs)) which are served by the node of wireless receiver 20. Conversely, wireless receiver 20 of the node receives transmissions from the plural wireless mobile terminals on an uplink (UL). In the uplink signal (and downlink as well), orthogonal spreading codes are used to channelize physical data channels. This orthogonal spreading code scheme is called OVSF (orthogonal variable spreading factor) spreading.

In general, not all spreading codes at a particular spreading factor are used to channelize data; and these unused codes will also be called "unoccupied" codes. In the present example embodiments, these unoccupied or unused codes can be advantageously employed at wireless receiver 20 of the radio base station receiver for, e.g., forming an impairment covariance matrix. As explained above, the impairment covariance matrix has use in generating a proper set of combining weights. To this end, FIG. 3 shows the impairment covariance matrix R as being applied to weight vector generator 62.

Figure 4:
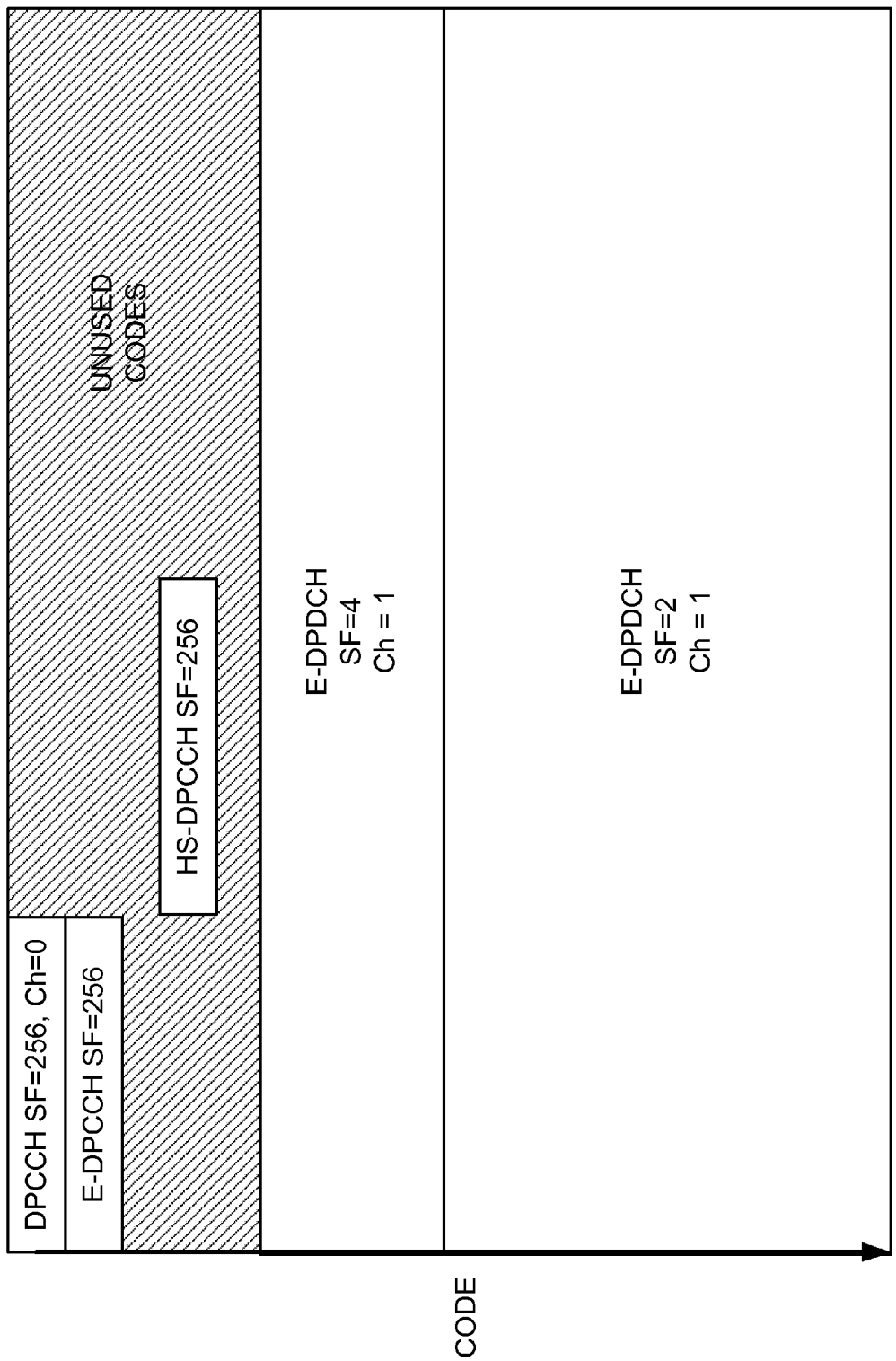
FIG. 4 is a diagrammatic view depicting code utilization for users having highest data rates on E-DPDCH.

FIG. 4 illustrates an example channelization coding allocation scheme and the existence of unused or unoccupied codes. FIG. 4 assumes a user is using the maximum code allocation for E-DPDCH. As shown in FIG. 4, one code of spreading factor (SF) 2 and one code of spreading factor (SF) 4 are used for E-DPDCH. In addition, one code of spreading factor (SF) 256 is used for DPCCH, and one code of spreading factor (SF) 256 is used for both HS-DPCCH and E-DPCCH through IQ multiplexing. This allocation leaves 61 unused codes at spreading factor (SF) 256. The unused codes are represented by the hatched area in FIG. 4. For users requiring fewer codes on E-DPDCH, the number of unused codes would be even higher.

Figure 5:
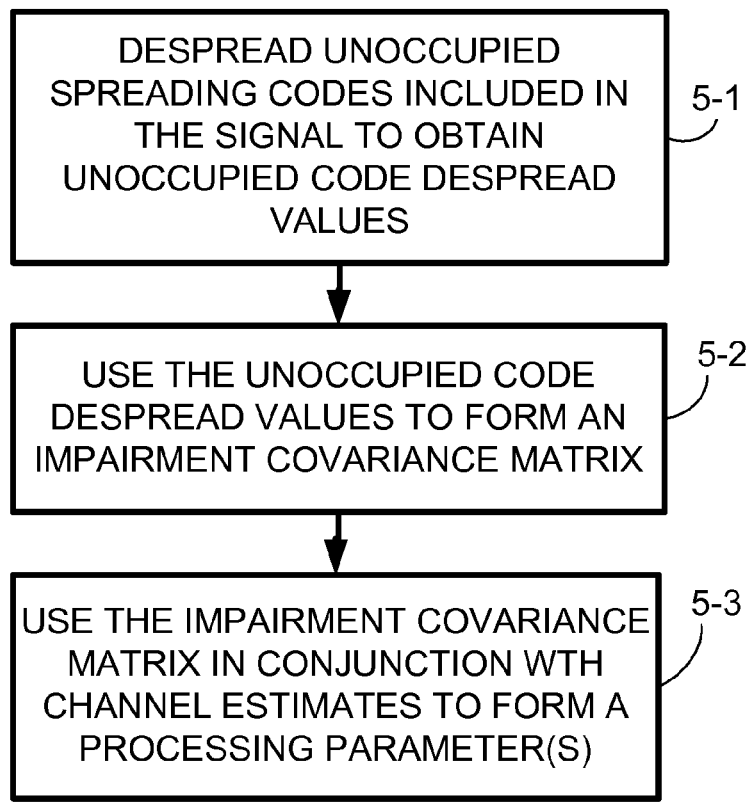
FIG. 5 is a flowchart showing example actions or steps in an example, representative procedure or method of estimating a covariance matrix by employing the unused or unoccupied codes.

Example actions or steps in an example, representative procedure or method of estimating a covariance matrix by employing the unused or unoccupied codes is illustrated in FIG. 5. The acts of FIG. 5 can be performed by G-RAKE processor 30 (including by its constituent impairment covariance matrix generator 60) in conjunction with the G-RAKE fingers 32. It should be realized that G-RAKE processor 30 can take the form of a processor or controller as those terms are herein expansively elaborated, which also includes a hardware implementation. Act 5-1 comprises despreading unoccupied spreading codes (e.g., codes which are essentially not used to spread traffic or control data) included in the signal to obtain unoccupied code despread values. Act 5-2 comprises using the unoccupied code despread values to form an impairment covariance matrix. Act 5-3 comprises using the impairment covariance matrix (generated by covariance matrix generator 60) in conjunction with channel estimates (obtained from channel estimator 56) to form a processing parameter(s). For example, the processing parameter(s) can be one of combining weights and signal quality estimate. Various embodiments and modes providing further details how these acts can be accomplished are described herein.

Despreading the unoccupied codes can provide an estimation of the impairment experienced by the traffic data of interest. There are multiple despread values for each unoccupied code, yielding multiple impairment estimations. The number of impairment estimations is further multiplied by the number of available unoccupied codes, which reduces the estimation error on the resulting impairment covariance matrix. Further, these multiple estimation points all occur within one slot, which means an improved number of estimation points can be utilized without extending the estimation window, and therefore without hampering the ability to track a changing channel.

Figure 1A:
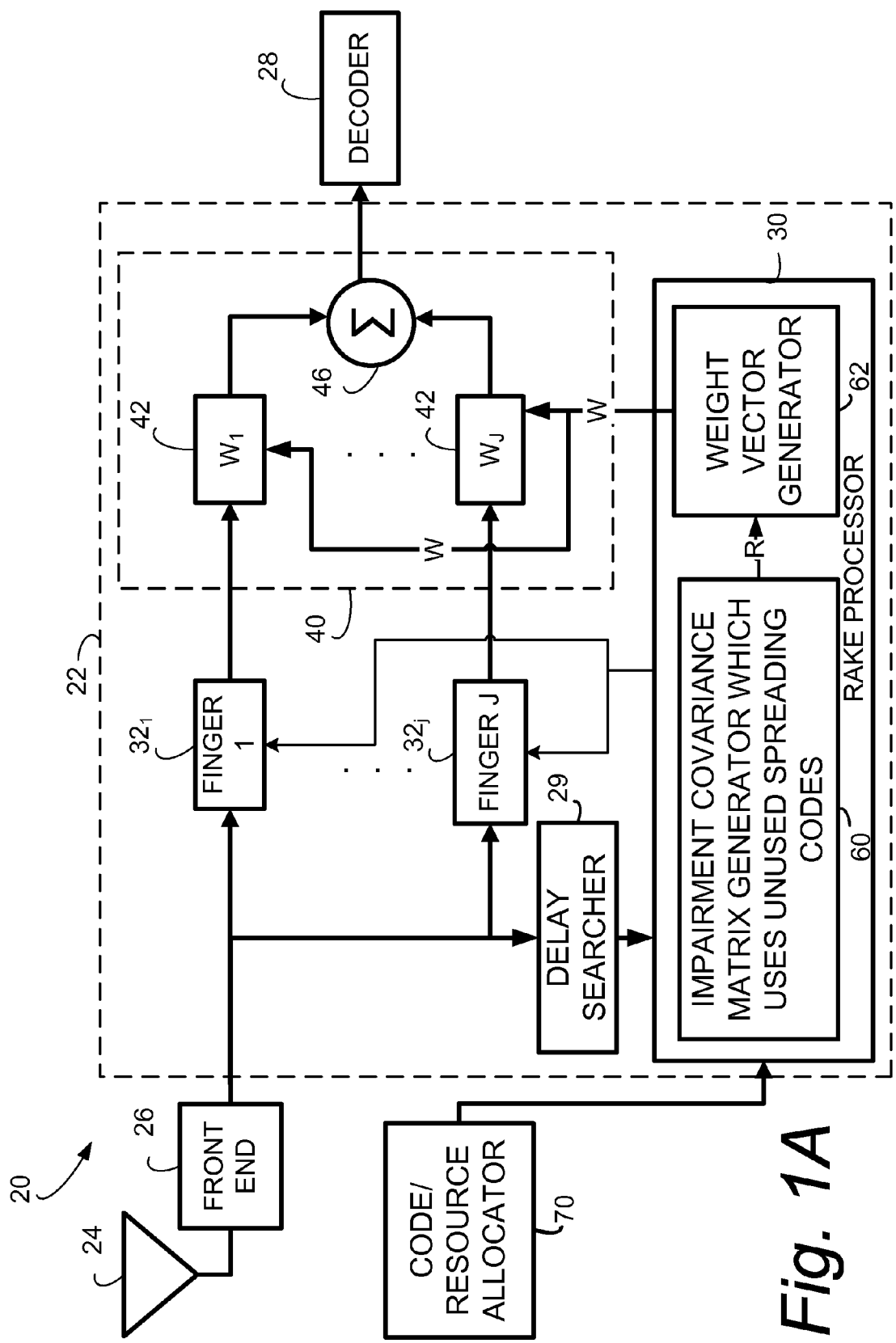
FIG. 1A and FIG. 1B are diagrammatic views of example variations of the example embodiment of FIG. 1, particularly illustrating different respective modes for determining which spreading codes are unoccupied spreading codes.

Determining which of the spreading codes are, in fact, unoccupied spreading codes can be determined or accomplished in several different ways. In a first example mode, illustrated in FIG. 1A, which codes are unoccupied spreading codes is known by virtue of the fact that the unoccupied spreading codes are those which, according to available resource allocation information, are not allocated for use, e.g., those not allocated for user traffic, control information, or other use. As shown in FIG. 1A, wireless receiver 20 has a code/resource allocator 70 which keeps tracks of what spreading codes are assigned (e.g., "used") for transmissions involving wireless receiver 20 of the node of FIG. 1A and the plural wireless mobile terminals served thereby. Therefore, code/resource allocator 70 keeps track of which spreading codes are not presently assigned and are accordingly "unused". Information regarding the codes, including which codes are "used" and which codes are "unused" are, in the example embodiment, made available by code/resource allocator 70 to G-RAKE processor 30. Thus, as one aspect of the present technology, in the case illustrated by FIG. 1A, unoccupied codes for the uplink (e.g., from wireless mobile stations to the radio base station) are preferably determined from system design.

Figure 1B:
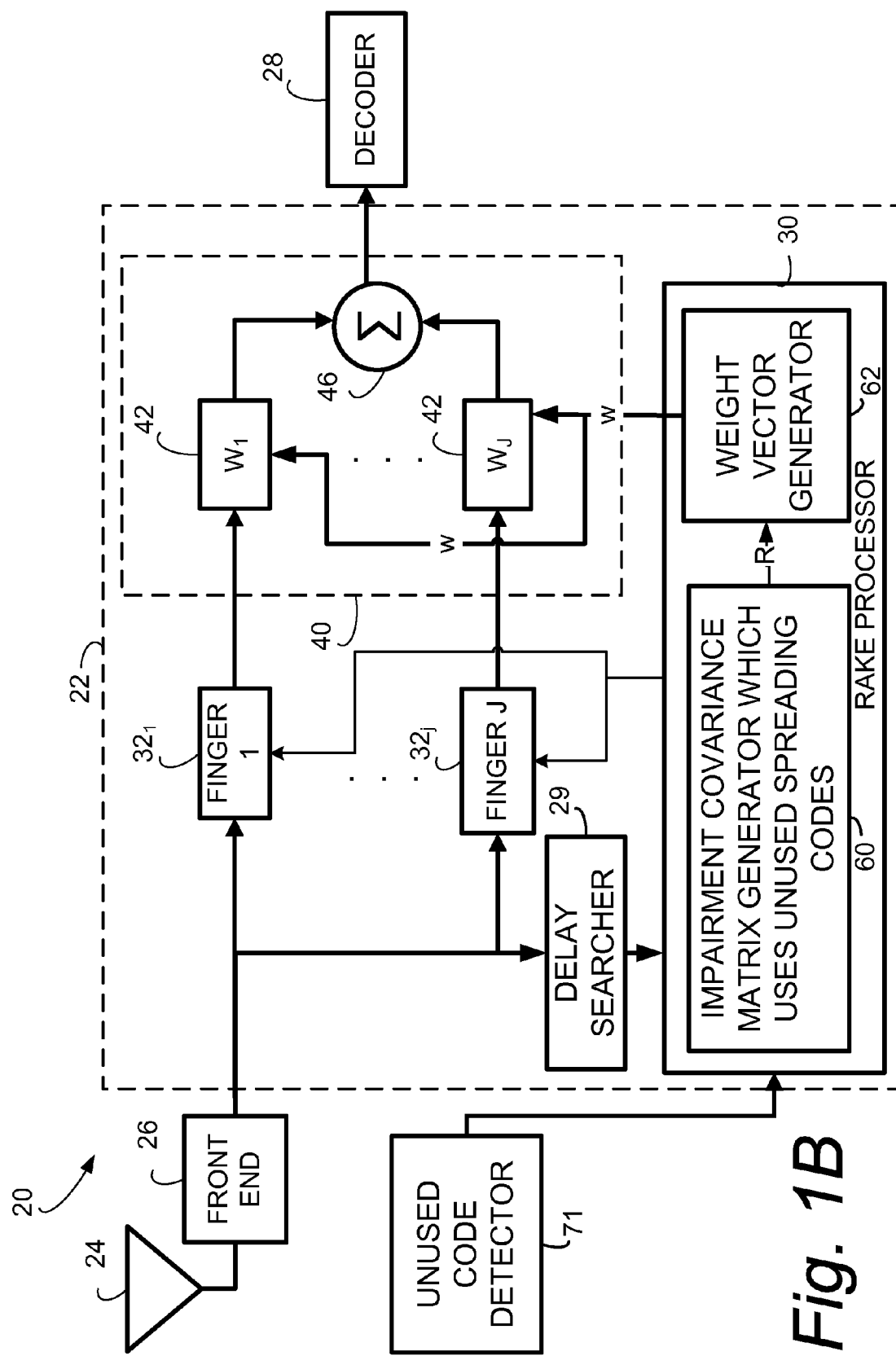

FIG. 1B illustrates a second example embodiment and mode for determining which codes are unoccupied spreading codes. As shown in FIG. 1B, wireless receiver 20 has an unused code detector 71 which keeps tracks of what spreading codes are assigned (e.g., "used") and which are not assigned ("unused"). The unused code detector 71 is configured to detect, e.g., a parameter indicative of non-allocation of the code such as received code power, for example, and then to threshold the power to determine if the code is occupied. Detection of such an "unused" indicative parameter, and particularly estimation of code power is understood with reference to G. E. Bottomley and Y.-P. E. Wang, "Method and apparatus for suppressing interference based on channelization code power estimation with bias removal," U.S. patent application Ser. No. 11/566,756, filed Dec. 5, 2006, and United States Patent Publication 20080130719, published Jun. 5, 2008, both of which are incorporated herein by reference.

Thus, impairment covariance matrix generator 60 of FIG. 1 is configured to make an estimation of an impairment covariance matrix for a coherent, linear equalizer (G-RAKE receiver or chip equalizer) using the impairment measured on the despread values of unoccupied codes in the signal. The impairment covariance matrix generator 60 obtains the identification of the unoccupied codes (e.g., from code/resource allocator 70 in the FIG. 1A embodiment or from the unused code detector 71 in the FIG. 1B embodiment). As understood with reference to, e.g., FIG. 1 as discussed herein, this covariance matrix R is used either (1) directly to give a "non-parametric" weight solution, or (2) indirectly, together with estimated channel coefficients, to determine scaling factors for the synthesis of an impairment covariance matrix used in a "parametric" weight solution.

Figure 5A:
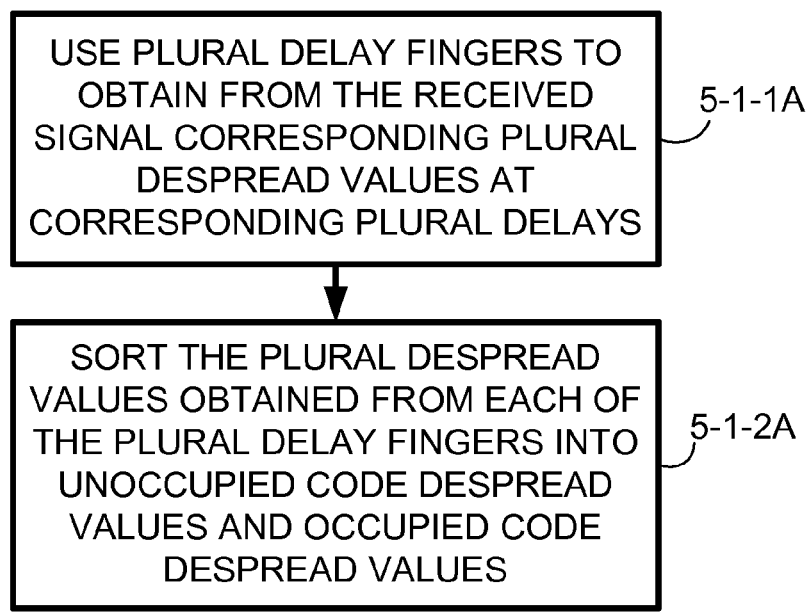
FIG. 5A, FIG. 5B, and FIG. 5C are flowcharts showing example subactions or substeps which can be employed in differing respective modes of implementing acts of the method of FIG. 5.

As mentioned above, act 5-1 involves, e.g., forming despread values for unused codes. Obtaining the unoccupied code despread values can be accomplished in several ways. A first example mode for obtaining the unoccupied code despread values comprises example substeps or subacts as represented in FIG. 5A. Subact 5-1-1A comprises using the plural delay fingers to obtain (from the received signal) corresponding plural despread values at corresponding plural delays. Subact 5-1-2A comprises processing the plural despread values obtained from each of the plural delay fingers into unoccupied code despread values and occupied code despread values. One example way of performing the processing of subact 5-1-2A comprises using a transform for processing the plural despread values obtained from each of the plural delay fingers into unoccupied code despread values and occupied code despread values. The transform can be a fast Hadamard transform, also known as fast Walsh transform.

Figure 6:
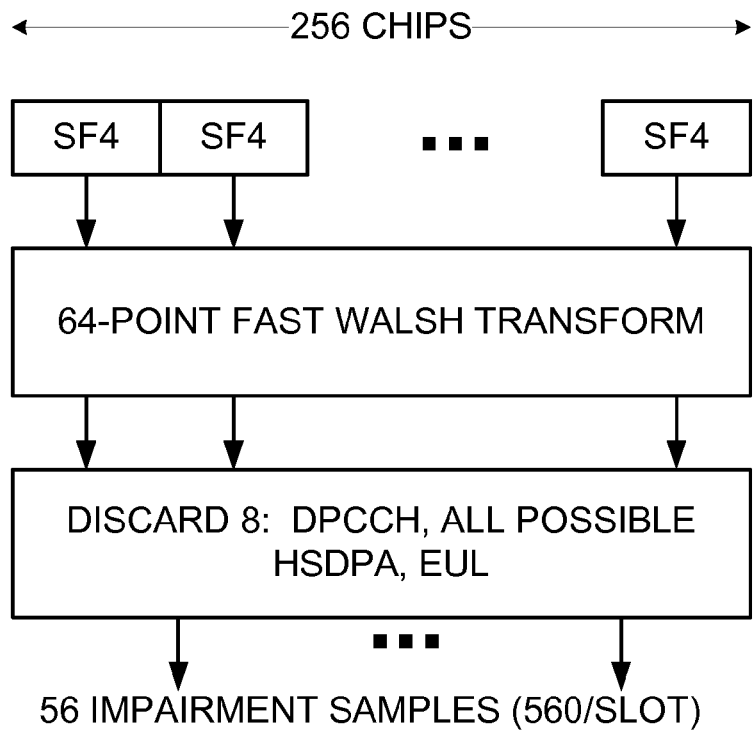
FIG. 6 is a diagrammatic view of unused code despreading through DPCCH partial despreading.

The example mode of FIG. 5A thus comprises partially despreading the DPCCH symbols, and subsequently combining these partial despread DPCCH symbol values to generate 256-chip unused-code despread values, in addition to DPCCH and other occupied code despread values. An example of a single finger is shown in FIG. 6 using initial despreading with spreading factor (SF)=4. A fast Walsh transform is used to efficiently generate length 256 despread values. Outputs corresponding to occupied codes are discarded or sent to other receiver functions (channel estimation, control and data channels demodulation). For simplicity, one can discard all possibly occupied codes, whether they are occupied or not. If fewer unused codes are needed, initial despreading can be done using a higher spreading factor (SF), such as 8, 16, etc. In this case, some of the occupied codes may not be formed, requiring separate despreaders for them. Alternatively, certain butterflies in the fast Walsh transform can be omitted.

Figure 5B:
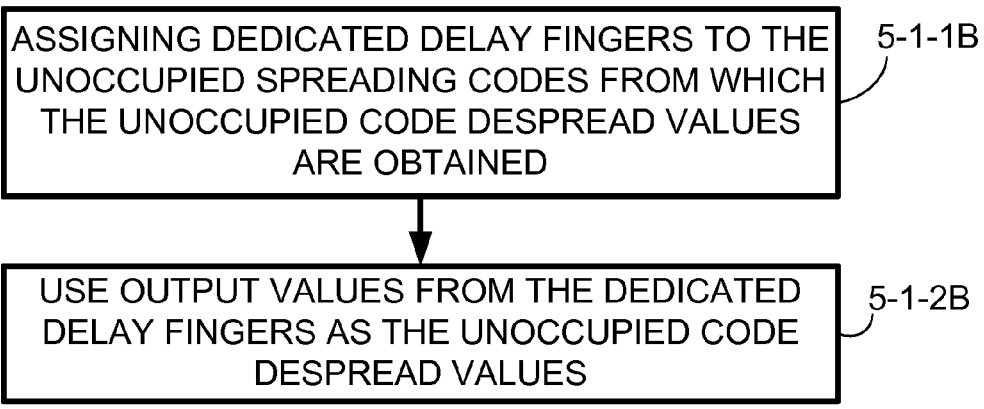
Figure 7:
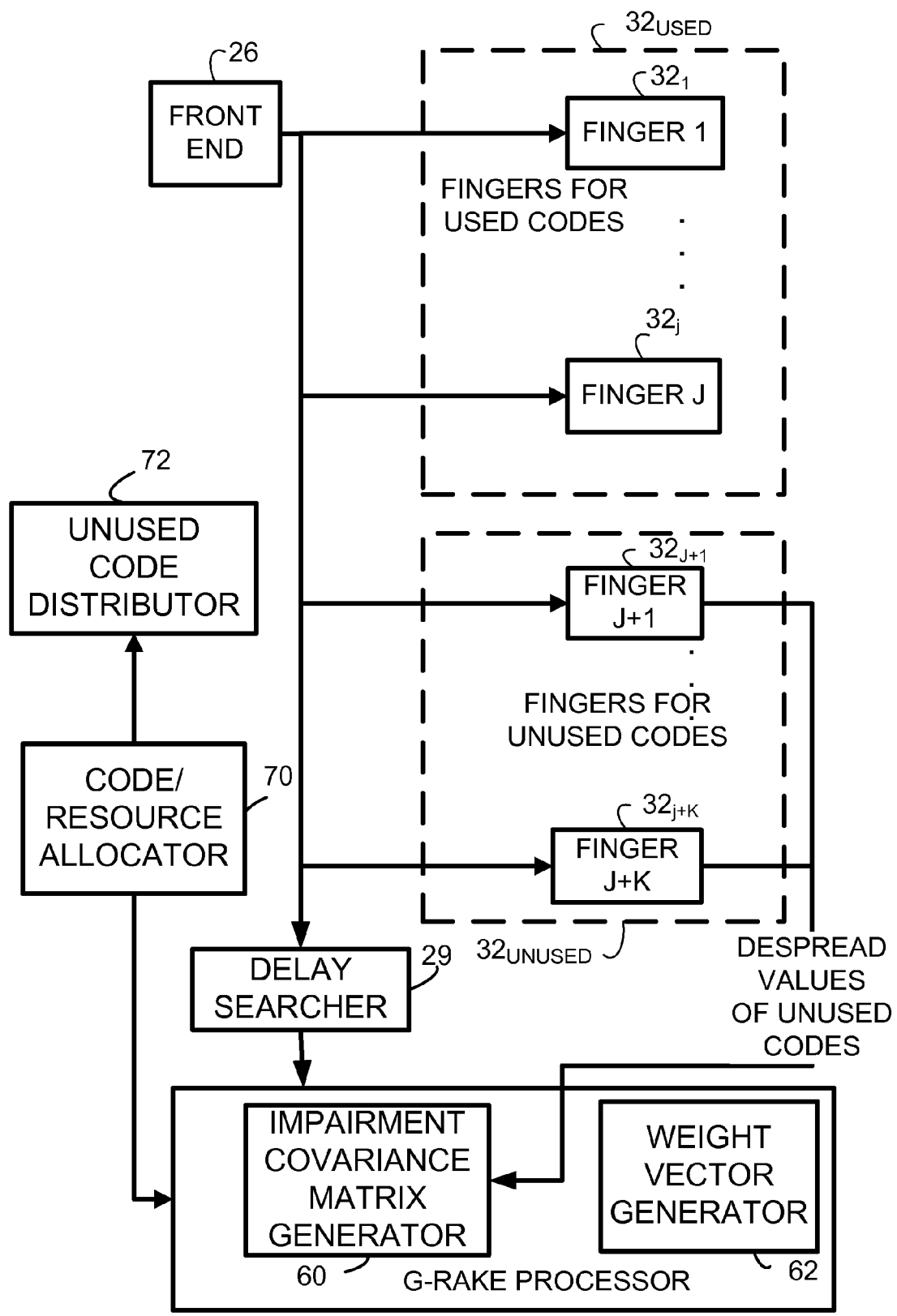
FIG. 7 is a schematic view showing portions of an example G-RAKE receiver according to an embodiment which comprises G-RAKE fingers allocated to unused spreading codes.

A second example mode for obtaining the unoccupied code despread values example substeps or subacts as represented in FIG. 5B. Subact 5-1-1B comprises assigning dedicated delay fingers to the unoccupied spreading codes from which the unoccupied code despread values are obtained. Subact 5-1-2B comprises using output values from the dedicated delay fingers as the unoccupied code despread values. An example embodiment which reflects the mode of FIG. 5B is illustrated in FIG. 7, and involves having extra sets of fingers assigned to these codes. For example, FIG. 7 shows portions of an example G-RAKE receiver 22 comprising a bank 32$_{USED}$ of used G-RAKE fingers 32 (e.g., G-RAKE fingers 32$_1$ through 32$_j$) and a bank 32$_{UNUSED}$ of unused G-RAKE fingers 32 (e.g., G-RAKE fingers 32$_{J+1}$ through 32$_{JaK'}$). Which G-RAKE fingers 32 are allocated to bank 32$_{UNUSED}$, and the coordination of distribution and employment of unused codes to the G-RAKE fingers 32 of bank 32$_{UNUSED}$ is supervised by unused code distributor 72.

Figure 5C:
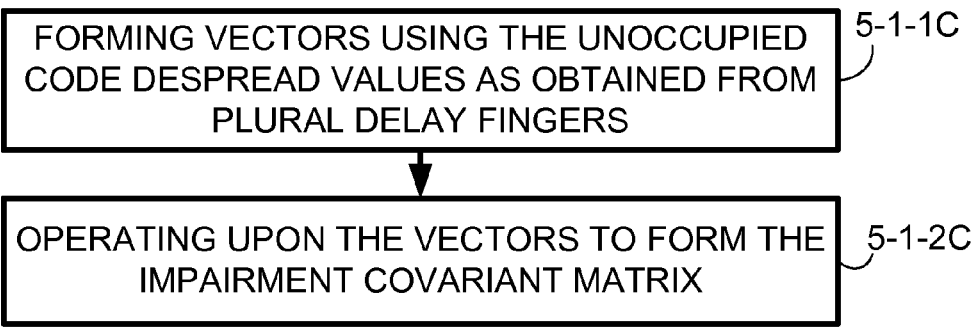

As mentioned above, act 5-2 comprises using the unoccupied code despread values to form an impairment covariance matrix. FIG. 5C illustrates example subacts or substeps of act 5-2 according to an example mode. In particular, act 5-2-1C comprises forming vectors using the unoccupied code despread values as obtained from plural delay fingers. Act 5-2-2C comprises operating upon the vectors to form the impairment covariance matrix. An example of such operation operating upon the vectors is taking outer products of the vectors.

In the above regard, and particularly with reference to subact 5-2-2C of the mode FIG. 5C, in an example embodiment the act of forming the impairment covariance matrix comprises using expression (2).

$$R_u = \left(\frac{1}{K}\right)\sum_{k=0}^{K-1} x_k x_k^H \quad (2)$$

In expression (2) $R_u$ is the impairment covariance matrix, $x_k$ are the despread value vectors, K is a number of samples, and the superscript H stands for Hermitian transpose. Thus, a particular element in the impairment covariance matrix can be written as $$R_u(a, b) = \left(\frac{1}{K}\right)\sum_{k=0}^{K-1} x_k(a) x_k^*(b) \quad (3)$$

where superscript "*" denotes taking the conjugate of a complex number. Note that because of Hermitian symmetry, only the upper or lower triangle (or some combination) need be computed.

Act 5-1 thus involves forming despread values at different finger delays for one or more unused codes (e.g., Walsh codes) for multiple symbol periods within a slot. For each Walsh code, this generates a series of despread vectors, denoted $x_k$. "Unused" in this context means unused by the user of interest. Act 5-2 involves estimating the R matrix using, e.g., expression (2). The estimation of act 5-2 can be performed by impairment covariance matrix generator 60. As an optional further act, the outer product $x_k x_k^H$ from multiple unused codes can be averaged together to improve the quality of the impairment covariance estimate.

Due to the need to eliminate occupied codes, the use of 256-chip codes should provide the most impairment samples. A sufficient number of impairment samples may be important as the WCDMA standard evolves and defines more and more control channels. Yet it is also possible to use unused codes having shorter lengths, e.g., shorter than 256 chips.

Figure 8:
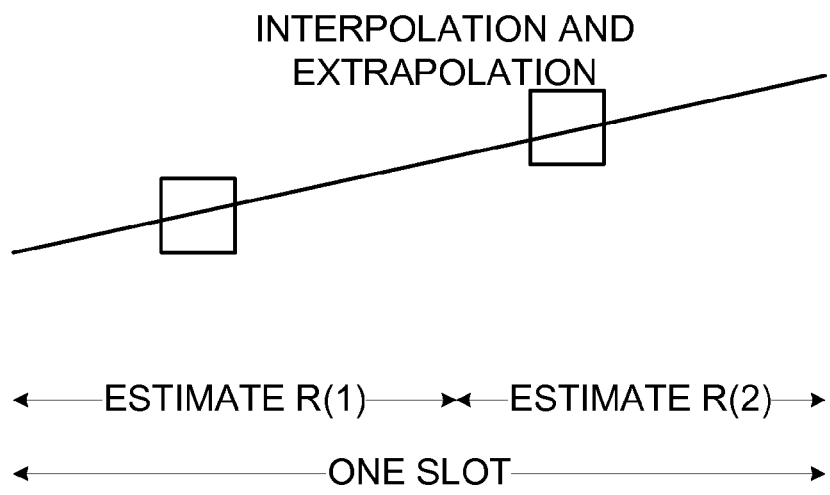
FIG. 8 is a diagrammatic view of an example subslot impairment covariance matrix estimation scheme.

While it has been assumed so far that only one R matrix estimate per slot is needed, in an example further embodiment it may be advantageous to estimate R for each half slot and then use linear interpolation and extrapolation. As shown in FIG. 8, the first R matrix estimate corresponds to time ¼-slot and the second R matrix estimate corresponds to time ¾-slot.

Linear interpolation and extrapolation can be used to obtain R matrix estimates each of 10 DPCCH symbol periods, for example. For example, if 160 samples are needed for each half-slot, then 32 unused codes would be needed as there are 5 DPCCH symbol periods in a half-slot interval (160/5=32). In general, a measured R per symbol period could be generated and then further processed to form one or more R matrices per slot. For example, a noisy R matrix estimate (an "R measurement") can be formed every symbol, giving ten R measurements in a slot. An "R measurement: is a short term R matrix estimate that is too nosiy to use as the actual R matrix estimate. These ten measurements can be the combined in any appropriate desired manner to obtain one or more R matrix estimates. For example, one could average all ten R measurements to obtain one R matrix estimate for the whole slot. Or one might average the first five R measurements to obtain an R matrix for just the first half of the slot.

Thus, as understood from the foregoing, the impairment covariance matrix can be generated over any of several time bases. For example, one mode of operation comprises obtaining/generating one impairment covariance matrix per time slot. Another mode of operation comprises obtaining/generating an impairment covariance matrix for each of plural sub-time slot periods, and then extrapolating or interpolating plural impairment covariance matrices obtained for each of the plural sub-time slot periods. Another mode of operation comprises obtaining/generating one impairment covariance matrix per symbol period, and then processing plural impairment covariance matrices obtained for each of plural symbol periods to obtain a resultant impairment covariance matrix for a time slot. The resulting impairment covariance matrix can be treated as a measured covariance and used to obtain fitting parameters which are then used to obtain the final impairment covariance matrix (a parametric approach). Such a fitting procedure is described in more detail in Cairns et al., Method and apparatus for parameter estimation in a Generalized RAKE receiver, PCT/EP2005/002419. Alternatively, the resulting impairment covariance matrix can be used directly as the final impairment covariance matrix (nonparametric approach).

Figure 9:
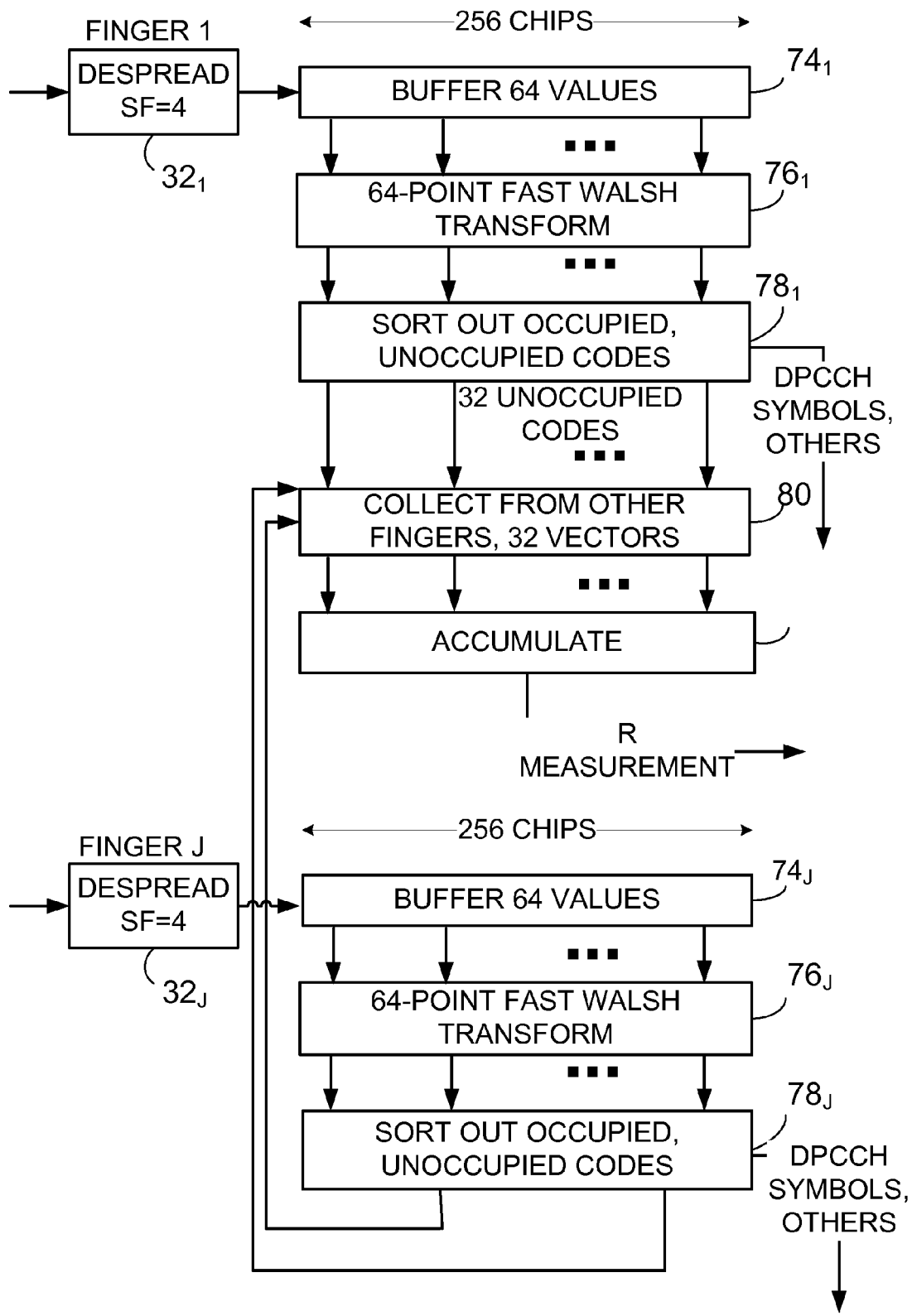
FIG. 9 is a diagrammatic view of an example hardware implementation of an impairment covariance matrix generator.

The acts and steps of performing the foregoing, and particularly of obtaining the R matrix, can (in an example embodiment and mode) be implemented in hardware. An example hardware implication is illustrated in FIG. 9. The hardware implementation of FIG. 9 essentially utilizes, by way of example, the mode of FIG. 5A, can be implemented in ASIC (Application Specific Integrated Circuit) or in FPGA (Field Programmable Gate Array). The latter is perhaps more suitable for use with a software-based architecture. The implementation of FIG. 9 can be embodiment in functionality such as impairment covariance matrix generator 60, for example.

The example hardware implementation of FIG. 9 comprises, for each of plural G-RAKE fingers 32 (e.g., G-RAKE fingers 32$_1$ through 32$_j$), buffer 74, transformer 76, and sorter 78. Partial despreading is performed (e.g., by the respective G-RAKE fingers 32) within a 256-chip symbol period. The results of the despreading are buffered and then passed through transformer 76. The transformer 76 can be, for example, a fast Hadamard transform such as a 64-point Fast Walsh transform. The output of transformer 76 produces despread values for DPCCH and other control channels as well as the unused-code despread values. Accordingly, sorter 78 associated with each G-RAKE finger 32 is employed to sort out the unoccupied or unused codes from the used codes. For example, the sorter $78_1$ associated with G-RAKE finger $32_1$ of FIG. 9 is shown as sorting out the despread values for DPCCH and other symbols, resulting (in this example instance) in 32 unoccupied codes. The unoccupied code despread values resulting from despreading, transforming, and sorting of each of the G-RAKE fingers are collected at collector/vector former 80. That is, the unused code despread values for different finger delays are collected into vectors by collector/vector former 80. The outer products of the vectors can be computed and accumulated (upper or lower triangle only) by accumulator 82. The accumulator 82 can be dumped and reset every 256 chips. Thus, every 256 chips, the device produces despread values for control channels as well as an R matrix measurement. The R measurements can be averaged, filtered, or processed in another way to form one or more R matrices per slot.

One R matrix measurement is output by accumulator 82 every 256 chips. The other R matrix measurements that are filtered, averaged, or processed can be obtained from other (e.g., subsequent) chips of the same slot.

Act 5-3 of the method of FIG. 5 comprises using the impairment covariance matrix (generated by covariance matrix generator 60) in conjunction with channel estimates (obtained from channel estimator 56) to form a processing parameter(s). For example, the processing parameter(s) can be one of combining weights and signal quality estimate, essentially in the manner previously described with reference to Expression (1a) and Expression (1b).

Figure 10:
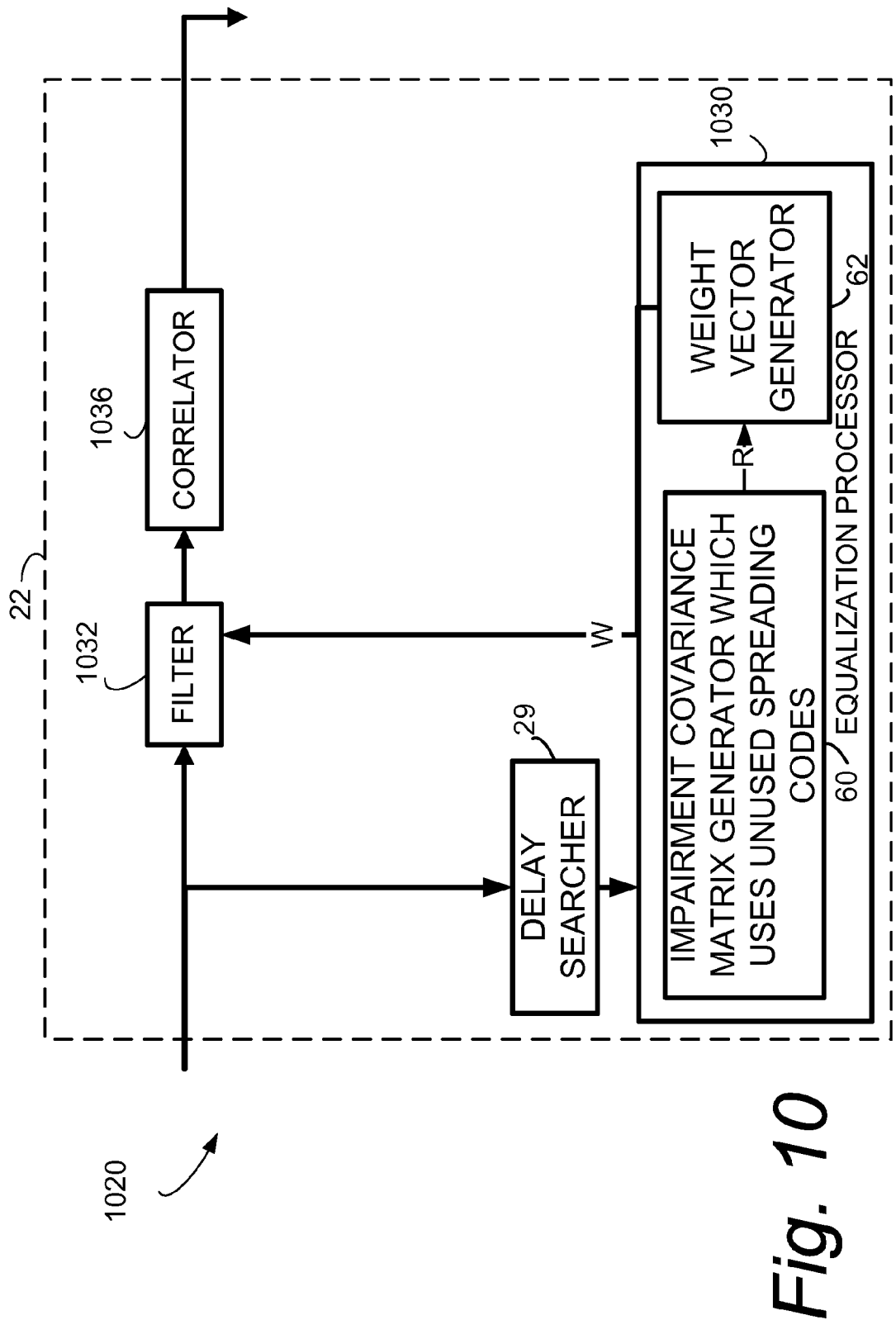
FIG. 10 is a schematic view of a chip equalizer according to an example embodiment.
Figure 1:
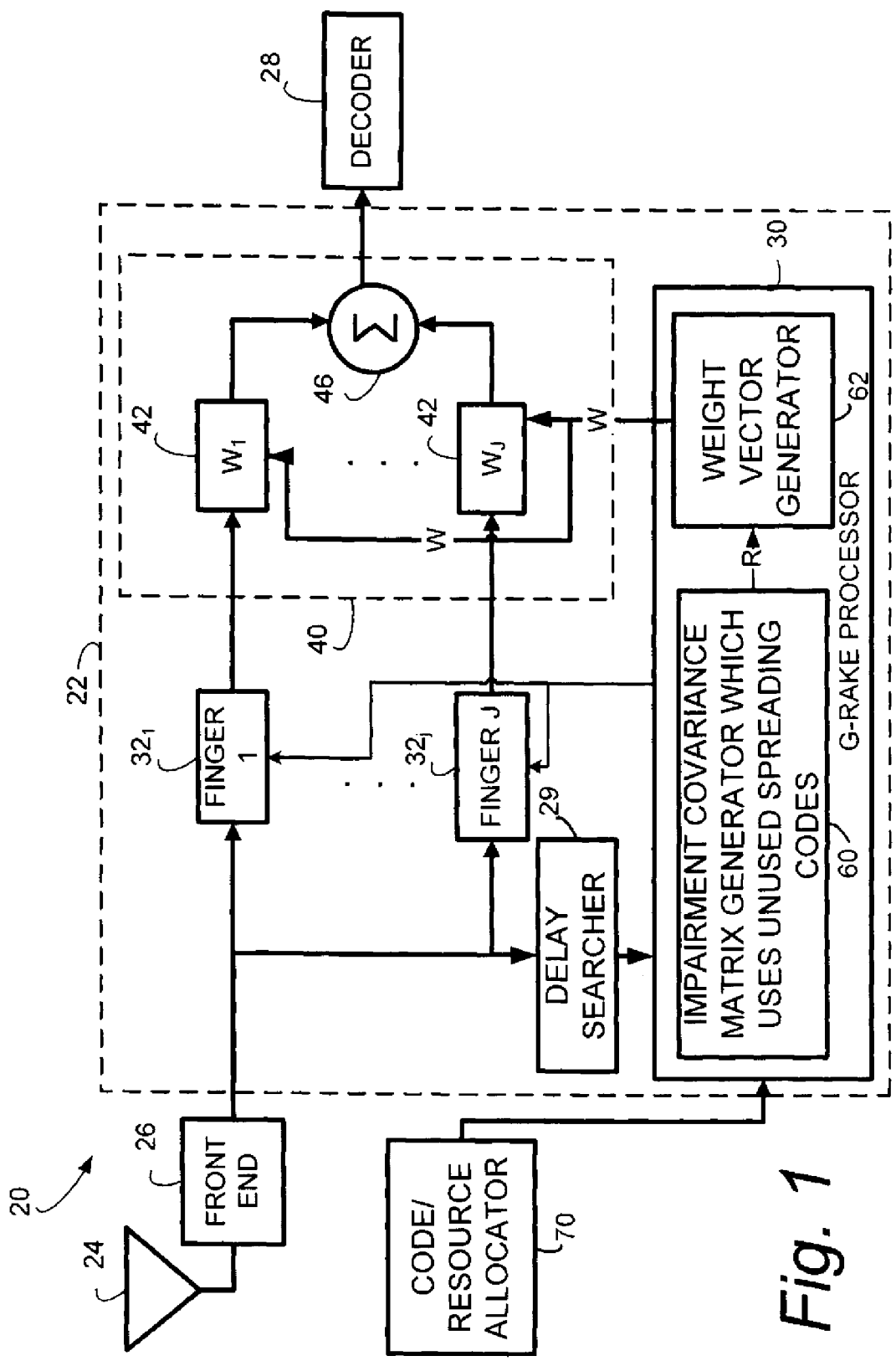

The present technology (including employment of the unused or unoccupied codes) is not necessarily confined to G-RAKE receivers. In alternate embodiments, the covariance matrix estimation which employs the unused or unoccupied codes can be used by chip-equalizers and symbol equalizers as well. The covariance matrix estimation which employs the unused or unoccupied codes can also be used for weight computation and/or SINR (signal quality) estimation. For example, FIG. 10 illustrates a chip equalizer 1020 comprising a filter 1032 that uses the combining weights (generated by equalization processor 1030) to output a weighted signal which is input to correlator 1036. The correlator 1036 despreads the weighted signal to yield a despread signal. The equalization processor 1030 comprises both covariance matrix generator 60 and weight vector generator 62, which function essentially in the manner previously described to provide the weight vector W which, in the FIG. 10 embodiment, is utilized by filter 1032 as filter weights.

There is existing analysis that determines (assuming h is known) what the average loss in SIR is, relative to an ideal receiver, as a function of the number of impairment samples used. See, e.g., 1. S. Reed, J. D. Mallett, and L. E. Brennan, "Rapid convergence rate in adaptive arrays," *IEEE Trans. Aerospace and Electronic Systems*, vol. AES-10, pp. 853-863, November 1974. The loss factor is given by Expression (16).

$$m = \frac{K+2-J}{K+1} \quad (16)$$

In Expression (16), K is the number of samples used and J is the number of combining fingers. Expression (16) can be arranged as Equation (17) to determine the number of samples needed for a given loss factor.

$$K = \frac{m-2+J}{1-m} \quad (17)$$

For example, for an 8-finger receiver, limiting the loss factor to −0.2 dB would require 155 samples (16 unused codes).

Figure 5D:
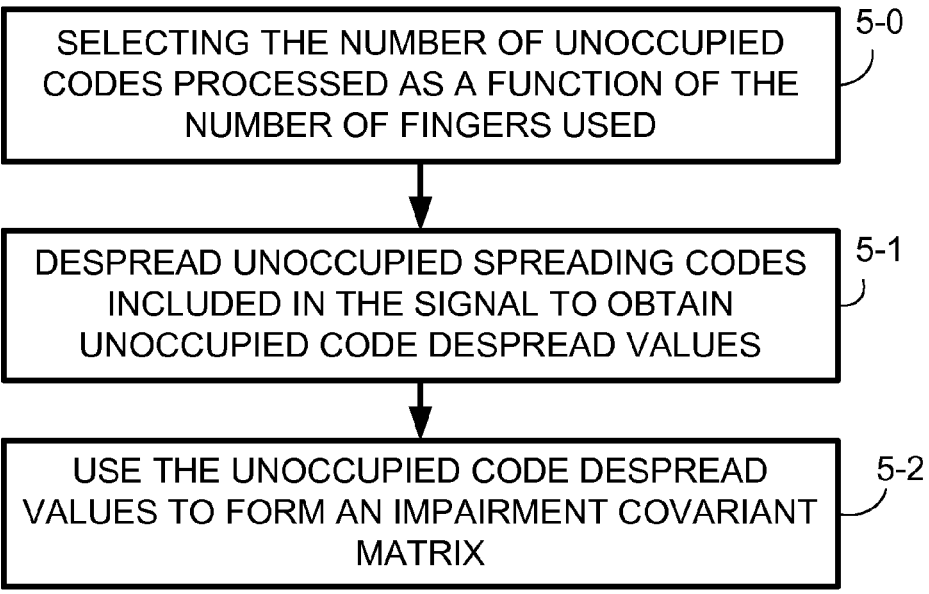
FIG. 5D is a flowchart showing an example variation of the method of FIG. 5.

Thus, an additional optional aspect of the technology is the optional use of adaptation to adaptively select the number of unoccupied codes processed as a function of the number of fingers used. For example, a table can be pre-computed to determine the number of unoccupied codes processed. To reflect this optional aspect, FIG. 5D illustrates that a preparatory act 5-0 can precede other acts such as the acts of FIG. 5. Act 5-0 comprises selecting the number of unoccupied codes processed as a function of the number of fingers used. In an example implementation, the selecting of act 5-0 can be performed by an entity such as unused code distributor 72 of FIG. 7, for example.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

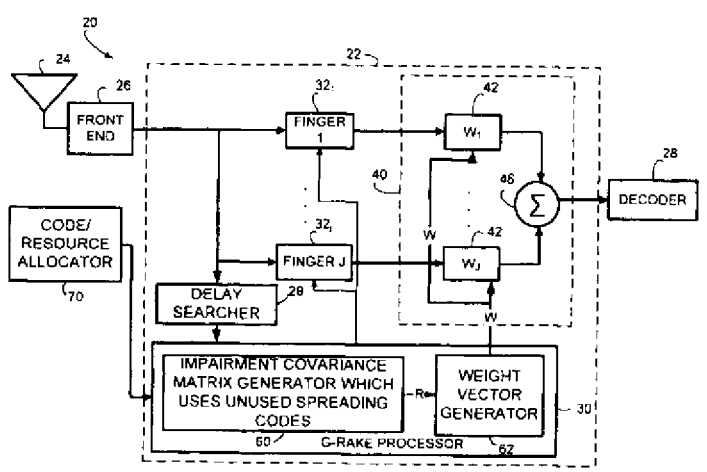

What is claimed is:

1. A method of processing a signal, the signal including physical data channels which have been channelized using spreading codes, the method comprising:
    obtaining from the signal unoccupied code despread values, the unoccupied code despread values being essentially unobscured by traffic data;
    using the unoccupied code despread values to form an impairment covariance matrix;
    using the impairment covariance matrix in conjunction with channel estimates to form a processing parameter; and,
    determining a selected number of unoccupied spreading codes from which to obtain the unoccupied code despread values as a function of a number of finger delays used for performing the despreading.

2. The method of claim 1, wherein the processing parameter is one of combining weights and signal quality estimates.

3. The method of claim 1, determining which of the spreading codes are unoccupied spreading codes in accordance with allocation information.

4. The method of claim 1, determining which of the spreading codes are unoccupied spreading codes in accordance with received code power.

5. The method of claim 1 in which using the unoccupied code despread values to form an impairment covariance matrix comprises
forming a measured impairment covariance matrix;
performing a fitting process to estimate fitting parameters using the measured impairment covariance matrix; and
forming an impairment covariance matrix using the fitting parameters.

6. The method of claim 5, further comprising operating upon the unoccupied code despread values by forming products.

7. The method of claim 5, further comprising:
using the plural delay fingers to obtain, from the received signal, corresponding plural despread values at corresponding plural delays;
sorting the plural despread values obtained from each of the plural delay fingers into unoccupied code despread values and occupied code despread values.

8. The method of claim 7, further comprising using a transform for sorting the plural despread values obtained from each of the plural delay fingers into unoccupied code despread values and occupied code despread values, and wherein the transform is a fast Walsh transform.

9. The method of claim 5, further comprising assigning dedicated delay fingers to the unoccupied spreading codes from which the unoccupied code despread values are obtained.

10. The method of claim 5, forming the impairment covariance matrix using the expression $$R_u(a, b) = \left(\frac{1}{K}\right)\sum_{k=0}^{K-1} x_k(a)x_k^*(b)$$

wherein $R_u(a,b)$ is the impairment covariance matrix, $x_k(a)$ is a despread value from an unused code, K is a number of samples, and superscript "*" denotes complex conjugate.

11. The method of claim 1, further comprising obtaining one impairment covariance matrix per time slot.

12. The method of claim 1, further comprising obtaining an impairment covariance matrix for each of plural sub-time slot periods.

13. The method of claim 12, further comprising extrapolating or interpolating plural impairment covariance matrices obtained for each of the plural sub-time slot periods.

14. The method of claim 1, further comprising obtaining one impairment covariance matrix per symbol period.

15. The method of claim 14, further comprising processing plural impairment covariance matrices obtained for each of plural symbol periods to obtain a resultant impairment covariance matrix for a time slot.

16. A coherent, linear equalizer apparatus configured to process a signal, the signal including physical data channels which have been channelized using spreading codes, the equalizer apparatus comprising:
plural delay fingers configured to obtain unoccupied code despread values from the signal;
a generator configured to use the unoccupied code despread values to form an impairment covariance matrix;
a channel estimator for estimating a coherent channel response;
a processor for using the impairment covariance matrix and coherent channel response to form a processing parameter; and
wherein the generator is configured to determine a selected number of unoccupied spreading codes from which to obtain the unoccupied code despread values as a function of a number of finger delays used for performing the despreading.

17. The apparatus of claim 16, wherein the processing parameter is one of combining weights and a signal quality estimate.

18. The apparatus of claim 16, wherein the equalizer is a chip equalizer.

19. The apparatus of claim 16, wherein the equalizer is a symbol-level equalizer.

20. The apparatus of claim 16, wherein the equalizer is situated at a radio base station of a radio access network node.

21. A coherent, linear equalizer apparatus configured to process a signal, the signal including physical data channels which have been channelized using spreading codes, the equalizer apparatus comprising:
plural delay fingers configured to obtain unoccupied code despread values from the signal;
a generator configured to use the unoccupied code despread values to form an impairment covariance matrix;
a channel estimator for estimating a coherent channel response; and
a processor for using the impairment covariance matrix and coherent channel response to form a processing parameter;
wherein the plural delay fingers are configured to obtain, from the received signal, corresponding plural despread values at corresponding plural delays; and
a sorter configured to sort the plural despread values obtained from each of the plural delay fingers into unoccupied code despread values and occupied code despread values.

22. The apparatus of claim 21, wherein the sorter is configured to use a transform for sorting the plural despread values obtained from each of the plural delay fingers into unoccupied code despread values and occupied code despread values, and wherein the transform is one of a fast Hadamard transform and a fast Walsh transform.

23. The apparatus of claim 16, further comprising dedicated delay fingers assigned to the unoccupied spreading codes from which the unoccupied code despread values are obtained.

24. The apparatus of claim 16, wherein the generator is configured to compute the impairment covariance matrix using the expression $$R_u(a, b) = \left(\frac{1}{K}\right)\sum_{k=0}^{K-1} x_k(a)x_k^*(b)$$

wherein $R_u(a,b)$ is the impairment covariance matrix, $x_a(k)$ is a despread value from an unused code, K is a number of samples, and superscript "*" denotes complex conjugate.

25. The apparatus of claim 16, wherein the generator is configured to obtain one impairment covariance matrix per time slot.

26. The apparatus of claim 16, wherein the generator is configured to obtain an impairment covariance matrix for each of plural sub-time slot periods.

27. A coherent, linear equalizer apparatus configured to process a signal, the signal including physical data channels which have been channelized using spreading codes, the equalizer apparatus comprising:

plural delay fingers configured to obtain unoccupied code despread values from the signal;

a generator configured to use the unoccupied code despread values to form an impairment covariance matrix;

a channel estimator for estimating a coherent channel response; and a processor for using the impairment covariance matrix and coherent channel response to form a processing parameter;

wherein the generator is configured to obtain an impairment covariance matrix for each of plural sub-time slot periods;

wherein the generator is configured to extrapolate or interpolate plural impairment covariance matrices obtained for each of the plural sub-time slot periods.

28. The apparatus of claim 16, wherein the generator is configured to obtain one impairment covariance matrix per symbol period.

29. The apparatus of claim 28, wherein the generator is configured to process plural impairment covariance matrices obtained for each of plural symbol periods to obtain a resultant impairment covariance matrix for a time slot.

* * * * *

UNITED STATES PATENT AND TRADEMARK OFFICE
CERTIFICATE OF CORRECTION

PATENT NO. : 8,098,715 B2  
APPLICATION NO. : 12/135268  
DATED : January 17, 2012  
INVENTOR(S) : Fulghum et al.

It is certified that error appears in the above-identified patent and that said Letters Patent is hereby corrected as shown below:

The title page showing the illustrative figure should be deleted to be replaced with the attached title page.

On Page 2, item (56), under "OTHER PUBLICATIONS", in Column 2, Line 1, delete "Kernin" and insert -- Kemin --, therefor.

On Page 2, item (56), under "OTHER PUBLICATIONS", in Column 2, Line 9, delete "Explointing" and insert -- Exploiting --, therefor.

In the drawing sheet, consisting of Fig. 1, should be deleted to be replaced with the drawing sheet, consisting of Fig. 1, as shown on the attached pages.

In the drawings:
In Fig. 5, Sheet 6 of 11, for Tag "5-3", in Line 2, delete "WTH" and insert -- WITH --, therefor.

In Column 11, Line 3, delete "Of" and insert -- of --, therefor.

In Column 11, Line 4, delete "$32_{J\alpha K'}$)." and insert -- $32_{j+K'}$)-- , therefor.

In Column 12, Line 12, delete "nosiy" and insert -- noisy --, therefor.

In Column 13, Line 55, delete "1. S." and insert -- I. S. --, therefor.

In Column 15, Line 6, in Claim 5, delete "comprises" and insert -- comprises: --, therefor.

Signed and Sealed this  
Nineteenth Day of June, 2012

David J. Kappos  
*Director of the United States Patent and Trademark Office*

(12) United States Patent
Fulghum et al.

(10) Patent No.: US 8,098,715 B2
(45) Date of Patent: Jan. 17, 2012

(54) METHOD AND APPARATUS FOR ESTIMATING IMPAIRMENT COVARIANCE MATRICES USING UNOCCUPIED SPREADING CODES

(75) Inventors: Tracy Fulghum, Durham, NC (US); Gregory E. Bottomley, Cary, NC (US); Yi-Pin Eric Wang, Cary, NC (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 839 days.

(21) Appl. No.: 12/135,268

(22) Filed: Jun. 9, 2008

(65) Prior Publication Data
US 2008/0304554 A1 Dec. 11, 2008

Related U.S. Application Data

(60) Provisional application No. 60/942,921, filed on Jun. 8, 2007.

(51) Int. Cl.
*H04B 1/00* (2006.01)
(52) U.S. Cl. .................................................. 375/149
(58) Field of Classification Search ............. 375/144, 375/147, 148, 149, 150, 151, 265, 267, 329; 370/203, 208, 320, 335, 342, 441
See application file for complete search history.

(56) References Cited

U.S. PATENT DOCUMENTS

| | | | |
|---|---|---|---|
| 6,363,104 B1 | 3/2002 | Bottomley | |
| 7,254,170 B2 * | 8/2007 | Shiu et al. | 375/227 |
| 2003/0072282 A1 * | 4/2003 | Liang | 370/335 |
| 2003/0133424 A1 * | 7/2003 | Liang et al. | 370/335 |
| 2005/0163196 A1 * | 7/2005 | Currivan et al. | 375/144 |
| 2005/0195889 A1 * | 9/2005 | Grant et al. | 375/148 |
| 2005/0201447 A1 | 9/2005 | Cairns | |
| 2006/0007990 A1 | 1/2006 | Cozzo et al. | |
| 2006/0221992 A1 * | 10/2006 | Chan et al. | 370/445 |

(Continued)

FOREIGN PATENT DOCUMENTS
WO 2005/096517 A1 10/2005

OTHER PUBLICATIONS

International Preliminary Report on Patentability mailed Dec. 30, 2009 in corresponding PCT Application No. PCT/US2008/066853.

(Continued)

*Primary Examiner* — David C. Payne
*Assistant Examiner* — Syed Haider
(74) *Attorney, Agent, or Firm* — Nixon & Vanderhye, P.C.

(57) ABSTRACT

In one of its aspects, the technology concerns a method of processing a signal which includes physical data channels which have been channelized using spreading codes. The method comprises (1) despreading unoccupied spreading codes (e.g., codes which are essentially unobscured by traffic data) included in the signal to obtain unoccupied code despread values, (2) using the unoccupied code despread values to form an impairment covariance matrix; and (3) using the impairment covariance matrix along with a channel estimate to form a processing parameter. The processing parameter can be one of combining sets and a signal quality estimate. In another of its aspects, the technology concerns a coherent, linear equalizer apparatus configured to process a signal which includes physical data channels which have been channelized using spreading codes. The equalizer apparatus comprises plural delay fingers (32) configured to despread unoccupied spreading codes included in the signal to obtain unoccupied code despread values, and a generator (60) configured to use the unoccupied code despread values to form an impairment covariance matrix.

29 Claims, 11 Drawing Sheets